United States Patent
Yang et al.

(10) Patent No.: US 10,454,156 B1
(45) Date of Patent: Oct. 22, 2019

(54) ANTENNA STRUCTURE

(71) Applicant: Wistron NeWeb Corp., Hsinchu (TW)

(72) Inventors: Cheng-Da Yang, Hsinchu (TW); Yan-Ting Wu, Hsinchu (TW); Irving Tseng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 16/101,755

(22) Filed: Aug. 13, 2018

(30) Foreign Application Priority Data

Jun. 7, 2018 (TW) .............................. 107119672 A (51) Int. Cl.
| | |
|---|---|
| *H01Q 1/24* | (2006.01) |
| *H01Q 5/335* | (2015.01) |
| *H01Q 13/10* | (2006.01) |
| *H01Q 5/378* | (2015.01) |
| *H01Q 9/04* | (2006.01) |
| *H01Q 9/16* | (2006.01) |
| *H01Q 1/48* | (2006.01) |
| *H04M 1/02* | (2006.01) |

(52) U.S. Cl.
CPC ............... *H01Q 1/243* (2013.01); *H01Q 1/48* (2013.01); *H01Q 5/335* (2015.01); *H01Q 5/378* (2015.01); *H01Q 9/0421* (2013.01); *H01Q 9/16* (2013.01); *H01Q 13/10* (2013.01); *H04M 1/0202* (2013.01)

(58) Field of Classification Search
CPC ............ H01Q 1/243; H01Q 1/48; H01Q 9/16; H01Q 9/0421; H01Q 13/10; H01Q 5/33
USPC ...................................................... 343/700 R
See application file for complete search history.

(56) References Cited

U.S. PATENT DOCUMENTS

| | | | | |
|---|---|---|---|---|
| 10,218,077 | B2 * | 2/2019 | Lepe | H01Q 1/243 |
| 10,224,644 | B1 * | 3/2019 | Park | H01Q 21/0075 |
| 10,290,946 | B2 * | 5/2019 | Romano | H01Q 13/10 |
| 10,355,339 | B2 * | 7/2019 | Jin | H01Q 21/28 |
| 2012/0231750 | A1 | 9/2012 | Jin et al. | |
| 2014/0292598 | A1 | 10/2014 | Bevelacqua et al. | |
| 2017/0033460 | A1 | 2/2017 | Ayala Vazquez et al. | |

FOREIGN PATENT DOCUMENTS

TW 200835055 A 8/2008

\* cited by examiner

*Primary Examiner* — Brian K Young
(74) *Attorney, Agent, or Firm* — McClure, Qualey & Rodack, LLP (57) ABSTRACT

An antenna structure includes a first ground element, a feeding element, a shorting element, a parasitic tuning element, a second ground element, a first parasitic element, a second parasitic element, and a dielectric substrate. The feeding element is coupled through the shorting element to the first ground element. The parasitic tuning element is coupled to the first ground element. The parasitic tuning element is at least partially surrounded by the feeding element, the shorting element, and the first ground element. The second ground element is adjacent to the feeding element. The first parasitic element and the second parasitic element are coupled to the second ground element. The feeding element, the shorting element, the parasitic tuning element, the first parasitic element, the second parasitic element, and at least one of the first ground element and the second ground element are disposed on the dielectric substrate.

20 Claims, 6 Drawing Sheets

ANTENNA STRUCTURE

CROSS REFERENCE TO RELATED APPLICATIONS

This application claims priority of Taiwan Patent Application No. 107119672 filed on Jun. 7, 2018, the entirety of which is incorporated by reference herein.

BACKGROUND OF THE INVENTION

Field of the Invention

The disclosure generally relates to an antenna structure, and more particularly, relates to an antenna structure applicable to a mobile device with a metal back cover.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, the newly added metal elements tend to negatively affect the antennas used for wireless communication in mobile devices, thereby degrading the overall communication quality of the mobile devices. As a result, there is a need to propose a mobile device and a novel antenna structure, so as to overcome the problems of the prior art.

BRIEF SUMMARY OF THE INVENTION

In an exemplary embodiment, the invention is directed to an antenna structure including a first ground element, a feeding element, a shorting element, a parasitic tuning element, a second ground element, a first parasitic element, a second parasitic element, and a dielectric substrate. The feeding element has a feeding point. The feeding element is coupled through the shorting element to the first ground element. The parasitic tuning element is coupled to the first ground element. The parasitic tuning element is at least partially surrounded by the feeding element, the shorting element, and the first ground element. The second ground element is adjacent to the feeding element. The first parasitic element and the second parasitic element are respectively coupled to the second ground element. The feeding element, the shorting element, the parasitic tuning element, the first parasitic element, the second parasitic element, and at least one of the first ground element and the second ground element are disposed on the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
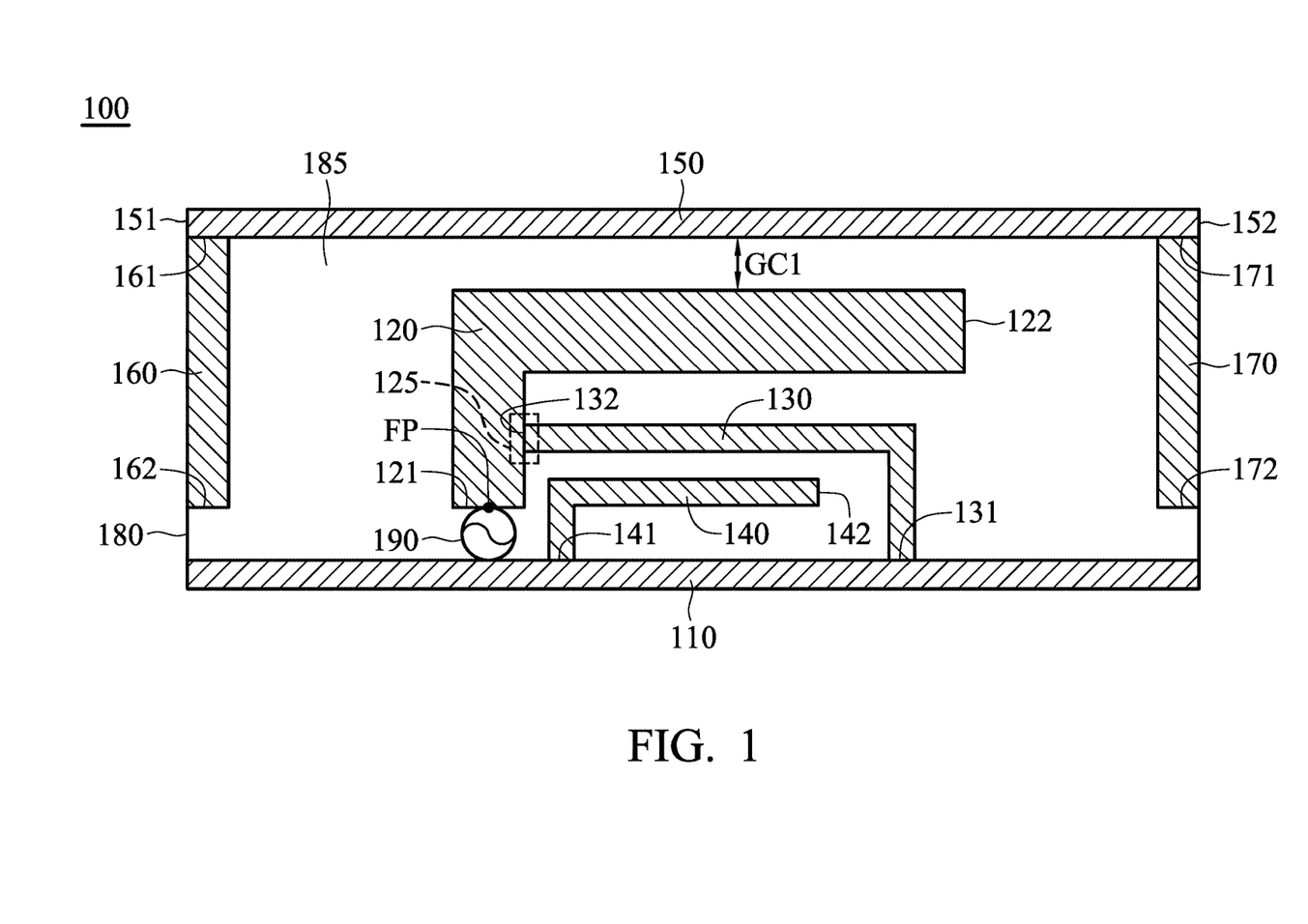
FIG. 1 is a top view of an antenna structure according to an embodiment of the invention.

FIG. 1 is a top view of an antenna structure 100 according to an embodiment of the invention. The antenna structure 100 is applicable to a mobile device, such as a smartphone, a tablet computer, or a notebook computer. As shown in FIG. 1, the antenna structure 100 includes a first ground element 110, a feeding element 120, a shorting element 130, a parasitic tuning element 140, a second ground element 150, a first parasitic element 160, a second parasitic element 170, and a dielectric substrate 180. The first ground element 110, the feeding element 120, the shorting element 130, the parasitic tuning element 140, the second ground element 150, the first parasitic element 160, and the second parasitic element 170 may be made of metal materials, such as copper, silver, aluminum, iron, or their alloys. The dielectric substrate 180 may be a PCB (Printed Circuit Board), an FR4 (Flame Retardant 4) substrate, or an FCB (Flexible Circuit Board). At least one of the first ground element 110 and the second ground element 150, the feeding element 120, the shorting element 130, the parasitic tuning element 140, the first parasitic element 160, and the second ground element 170 are disposed on a surface of the dielectric substrate 180.

Each of the first ground element 110 and the second ground element 150 may substantially have a straight-line shape. The first ground element 110 and the second ground element 150 may be substantially parallel to each other. In some embodiments, the first ground element 110 and the second ground element 150 are coupled to each other, and they are together used to provide a ground voltage. For example, the first ground element 110 and the second ground element 150 may be ground copper foils extending onto the dielectric substrate 180, or may be a portion of an appearance decorative element of a mobile device.

The feeding element 120 may substantially have an inverted L-shape. The feeding element 120 has a feeding point FP, which may be coupled to a signal source 190. For example, the signal source 190 may be an RF (Radio Frequency) module for exciting the antenna structure 100. Specifically, the feeding element 120 has a first end 121 and a second end 122. The feeding point FP is positioned at the first end 121 of the feeding element 120. The second end 122 of the feeding element 120 is an open end.

The shorting element 130 may substantially have an inverted L-shape. The feeding element 120 is coupled through the shorting element 130 to the first ground element 110. Specifically, the shorting element 130 has a first end 131 and a second end 132. The first end 131 of the shorting element 130 is coupled to the first ground element 110. The second end 132 of the shorting element 130 is coupled to a median portion 125 of the feeding element 120. The median portion 125 of the feeding element 120 is positioned between the first end 121 and the second end 122 of the feeding element 120. The median portion 125 is relatively close to the first end 121 of the feeding element 120 and is relatively far away from the second end 122 of the feeding element 120.

The parasitic tuning element 140 may substantially have an inverted L-shape. Specifically, the parasitic tuning element 140 has a first end 141 and a second end 142. The first end 141 of the parasitic tuning element 140 is coupled to the first ground element 110. The second end 142 of the parasitic tuning element 140 is an open end. The parasitic tuning element 140 is at least partially or completely surrounded by the feeding element 120, the shorting element 130, and the first ground element 110.

The second ground element 150 is disposed adjacent to the feeding element 120. A coupling gap GC1 is formed between the feeding element 120 and the second ground element 150. Specifically, the second ground element 150 has a first end 151 and a second end 152. The coupling gap GC1 is substantially positioned at or adjacent to a central point between the first end 151 and the second end 152. The first parasitic element 160 may substantially have a straight-line shape, and it may be substantially perpendicular to the second ground element 150. The first parasitic element 160 has a first end 161 and a second end 162. The first end 161 of the first parasitic element 160 is coupled to the first end 151 of the second ground element 150. The second end 162 of the first parasitic element 160 is an open end. The second parasitic element 170 may substantially have a straight-line shape, and it may be substantially perpendicular to the second ground element 150. The second parasitic element 170 has a first end 171 and a second end 172. The first end 171 of the second parasitic element 170 is coupled to the second end 152 of the second ground element 150. The second end 172 of the second parasitic element 170 is an open end. The second end 162 of the first parasitic element 160 and the second end 172 of the second parasitic element 170 may substantially extend in the same direction.

The feeding element 120, the shorting element 130, and the parasitic tuning element 140 are substantially surrounded by the first ground element 110, the first parasitic element 160, the second ground element 150, and the second parasitic element 170. Specifically, a combination of the first parasitic element 160, the second ground element 150, and the second parasitic element 170 may substantially have an inverted U-shape. The feeding element 120, the shorting element 130, and the parasitic tuning element 140 may be all disposed inside a notch 185 defined by the aforementioned inverted U-shape. Specifically, the feeding element 120, the shorting element 130, and the parasitic tuning element 140 may be all positioned between the first parasitic element 160 and the second parasitic element 170. Furthermore, the feeding element 120, the shorting element 130, the parasitic tuning element 140, the first parasitic element 160, and the second parasitic element 170 may be all positioned between the first ground element 110 and the second ground element 150.

According to practical measurements, the antenna structure 100 can cover a low-frequency band and a high-frequency band. For example, the aforementioned low-frequency band may be from about 2400 MHz to about 2500 MHz, and the aforementioned high-frequency band may be from about 5150 MHz to about 5850 MHz. Accordingly, the antenna structure 100 can support at least the dual-wideband operations of WLAN (Wireless Local Area Network) 2.4 GHz/5 GHz.

With respect to the antenna principles, the second ground element 150, the first parasitic element 160, and the second parasitic element 170 are excited by the feeding element 120 using a coupling mechanism, so as to form a low-frequency resonant path. The low-frequency resonant path corresponds to the aforementioned low-frequency band. Furthermore, the feeding element 120 forms a high-frequency resonant path. The high-frequency resonant path corresponds to the aforementioned high-frequency band. The shorting element 130 can fine-tune the impedance matching of the antenna structure 100. The parasitic tuning element 140 can also be excited by the feeding element 120 by using a coupling mechanism, so as to increase the bandwidth of the aforementioned high-frequency band.

In some embodiments, the element sizes of the antenna structure 100 are as follows. The length of the feeding element 120 (i.e., the length from the first end 121 to the second end 122) may be longer than or equal to the length of the shorting element 130 (i.e., the length from the first end 131 to the second end 132). The length of the shorting element 130 may be longer than the length of the parasitic tuning element 140 (i.e., the length from the first end 141 to the second end 142). The total length of the first parasitic element 160, the second ground element 150, and the second parasitic element 170 (i.e., the total length from the second end 162 through the first end 151 and the second end 152 to the second end 172) may be longer than the length of the feeding element 120. The width of the feeding element 120 may be wider than the width of the shorting element 130, and may also be wider than the width of the parasitic tuning element 140. The length of the feeding element 120 may be substantially equal to 0.25 wavelength ($\lambda/4$) of the aforementioned high-frequency band. The length of the parasitic tuning element 140 may be shorter than 0.25 wavelength ($\lambda/4$) of the aforementioned high-frequency band. The width of the coupling gap GC1 between the feeding element 120 and the second ground element 150 may be from 0.1 mm to 2.5 mm. The above element sizes are calculated and obtained according to many experiment results, and they help to optimize the operation bandwidth and the impedance matching of the antenna structure 100.

Figure 2:
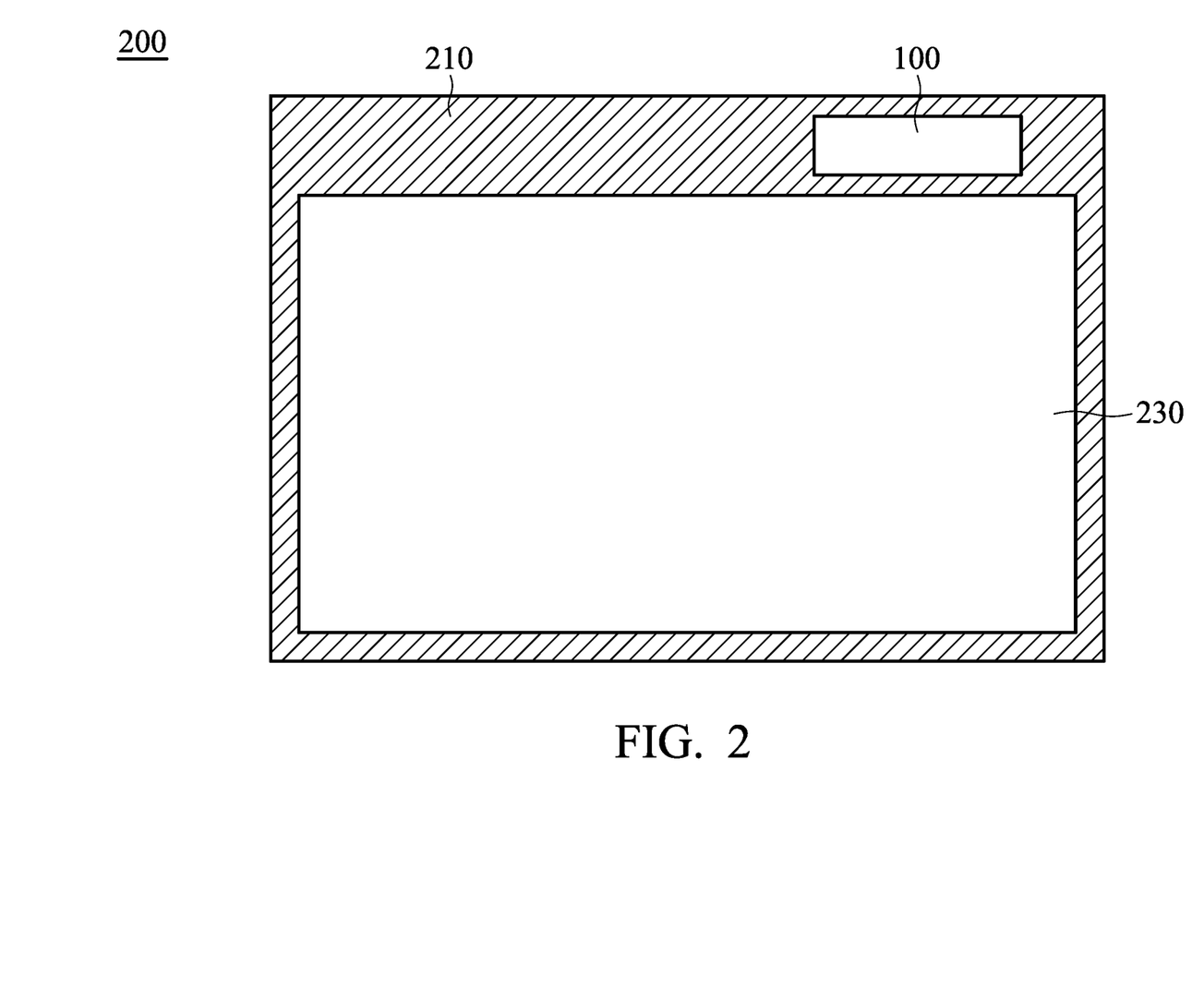
FIG. 2 is a diagram of a mobile device according to an embodiment of the invention.

FIG. 2 is a diagram of a mobile device 200 according to an embodiment of the invention. In the embodiment of FIG. 2, the antenna structure 100 is integrated with the mobile device 200. Specifically, the mobile device 200 includes a metal back cover 210 and a display device 230. The second ground element 150 of the antenna structure 100 is electrically connected to the metal back cover 210.

Figure 3:
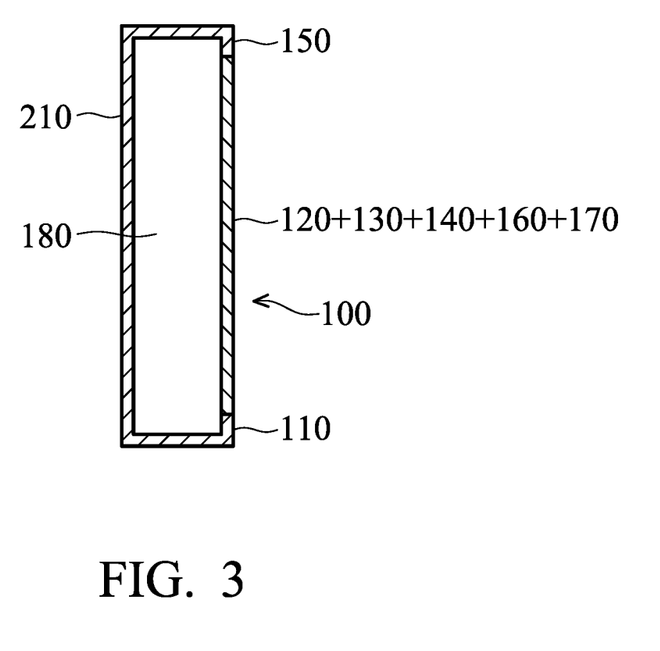
FIG. 3 is a side view of an antenna structure according to an embodiment of the invention.

FIG. 3 is a side view of the antenna structure 100 according to an embodiment of the invention. Please refer to FIG. 2 and FIG. 3 together. In the embodiment of FIG. 3, a portion of the metal back cover 210 of the mobile device 200 is formed by either the first ground element 110 or the second ground element 150 of the antenna structure 100. In other words, at least one of the first ground element 110 and the second ground element 150 is electrically connected to the metal back cover 210. Such a design can minimize the space occupied by the antenna structure 100, and prevent the antenna structure 100 from negatively affecting the appearance of the mobile device 200. However, the invention is not limited thereto. In other embodiments, the relative positions of the antenna structure 100 and the metal back cover 210 are adjustable according to different requirements.

Figure 4:
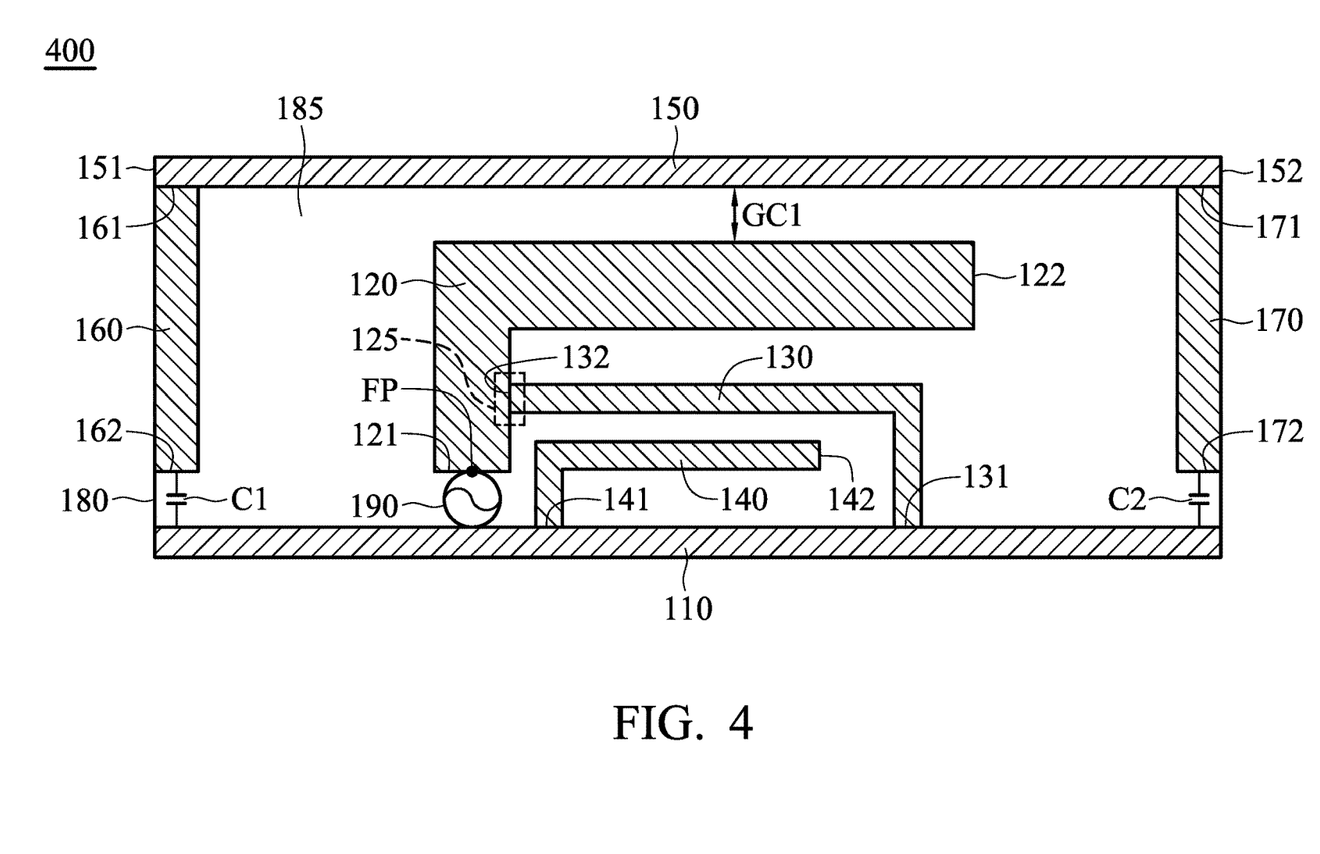
FIG. 4 is a top view of an antenna structure according to another embodiment of the invention.

FIG. 4 is a top view of an antenna structure 400 according to another embodiment of the invention. FIG. 4 is similar to FIG. 1. In the embodiment of FIG. 4, the antenna structure 400 further includes a first capacitor C1 and a second capacitor C2. The first capacitor C1 is coupled between the second end 162 of the first parasitic element 160 and the first ground element 110, such that the first parasitic element 160 is coupled through the first capacitor C1 to the first ground element 110. The second capacitor C2 is coupled between the second end 172 of the second parasitic element 170 and the first ground element 110, such that the second parasitic element 170 is coupled through the second capacitor C2 to the first ground element 110. The first capacitor C1 and the second capacitor C2 are configured to fine-tune the effective lengths of the low-frequency resonant paths of the antenna structure 400, thereby reducing the total size of the antenna structure 400. In some embodiments, the capacitance of each of the first capacitor C1 and the second capacitor C2 is from 0.1 pF to 1 pF. For example, each of the first capacitor C1 and the second capacitor C2 may be implemented with a fixed capacitor or a variable capacitor. In alternative embodiments, the antenna structure 400 merely includes either the first capacitor C1 or the second capacitor C2. Other features of the antenna structure 400 of FIG. 4 are similar to those of the antenna structure 100 of FIG. 1. Accordingly, the two embodiments can achieve similar levels of performance.

Figure 5:
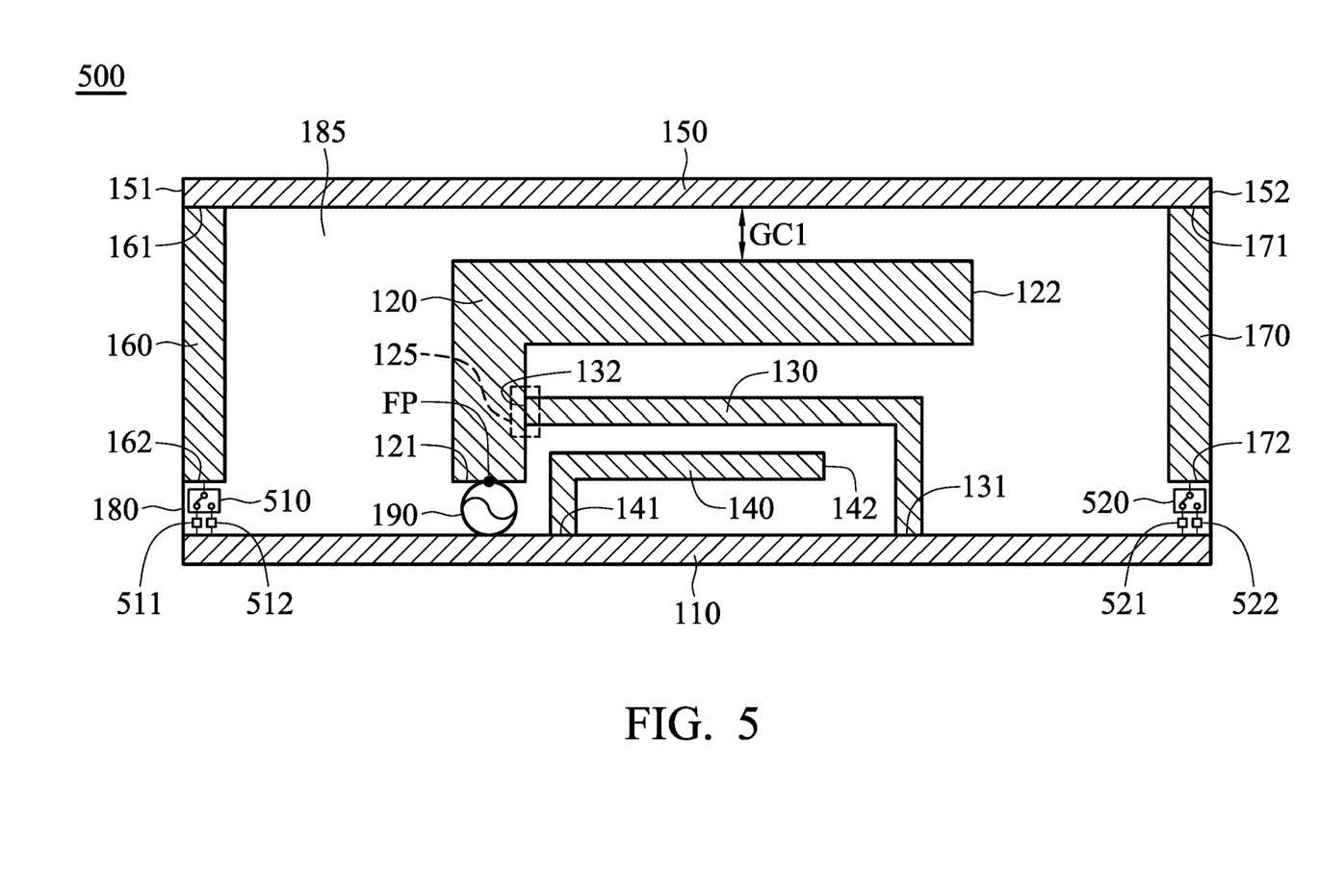
FIG. 5 is a top view of an antenna structure according to another embodiment of the invention.

FIG. 5 is a top view of an antenna structure 500 according to another embodiment of the invention. FIG. 5 is similar to FIG. 1. In the embodiment of FIG. 5, the antenna structure 500 further includes a first switch element 510, a plurality of first impedance elements 511 and 512, a second switch element 520, and a plurality of second impedance elements 521 and 522. The first switch element 510 is coupled to the second end 162 of the first parasitic element 160. The first impedance elements 511 and 512 are coupled to the first ground element 110. The first impedance elements 511 and 512 may have different impedance values. For example, each of the first impedance elements 511 and 512 may be implemented with a capacitor, an inductor, or a resistor. The first switch element 510 selects one of the first impedance elements 511 and 512 according to a first control signal, such that the first parasitic element 160 is coupled through the selected first impedance element to the first ground element 110. The second switch element 520 is coupled to the second end 172 of the second parasitic element 170. The second impedance elements 521 and 522 are coupled to the first ground element 110. The second impedance elements 521 and 522 may have different impedance values. For example, each of the second impedance elements 521 and 522 may be implemented with a capacitor, an inductor, or a resistor. The second switch element 520 selects one of the second impedance elements 521 and 522 according to a second control signal, such that the second parasitic element 170 is coupled through the selected second impedance element to the first ground element 110. The first control signal and the second control signal may be generated by a processor (not shown) according to a user input or a frequency control instruction. The first switch element 510 and the second switch element 520 are configured to change the effective lengths of the low-frequency resonant paths of the antenna structure 500, thereby widening the operation bandwidth of the antenna structure 500. In alternative embodiments, the antenna structure 500 merely includes the first switch element 510 and its corresponding first impedance elements 511 and 512, or merely includes the second switch element 520 and its corresponding second impedance elements 521 and 522. It should be understood that although there are merely two first impedance elements 511 and 512 and two second impedance elements 521 and 522 displayed in FIG. 5, in other embodiments, the antenna structure 500 may include more first impedance elements and more second impedance elements according to different requirements. Other features of the antenna structure 500 of FIG. 5 are similar to those of the antenna structure 100 of FIG. 1. Accordingly, the two embodiments can achieve similar levels of performance.

Figure 6:
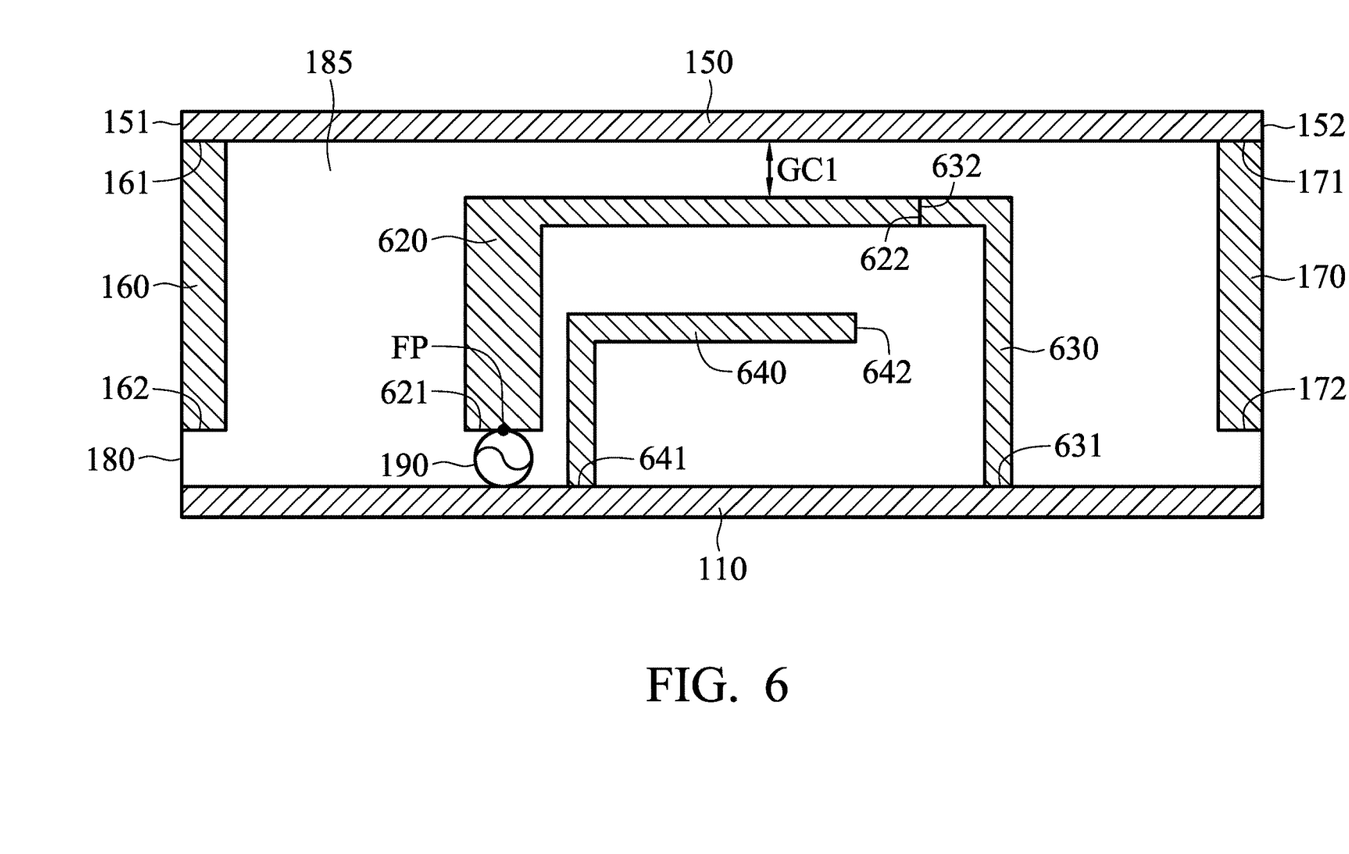
FIG. 6 is a top view of an antenna structure according to another embodiment of the invention.

FIG. 6 is a top view of an antenna structure 600 according to another embodiment of the invention. FIG. 6 is similar to FIG. 1. In the embodiment of FIG. 6, the resonant mechanism of a feeding element 620, a shorting element 630, and a parasitic tuning element 640 of the antenna structure 600 is slightly adjusted, without affecting the whole function of the antenna structure 600. Specifically, a second end 632 of the shorting element 630 is directly coupled to a second end 622 of the feeding element 620, such that a loop shape is substantially formed by a combination of the feeding element 620, the shorting element 630, and the first ground element 110. The parasitic tuning element 640 is completely surrounded by the loop shape. The total length of the feeding element 620 and the shorting element 630 (i.e., the total length from the first end 621 of the feeding element 620 through the second end 622 to the first end 631 of the shorting element 630) may be substantially equal to 0.5 wavelength ($\lambda/2$) of a high-frequency band of the antenna structure 600. With such a design, the feeding element 620 and the shorting element 630 are together excited to generate the high-frequency band of the antenna structure 600, and this loop resonant mechanism can prevent the antenna structure 600 from being easily affected by nearby metal elements. Other features of the antenna structure 600 of FIG. 6 are similar to those of the antenna structure 100 of FIG. 1. Accordingly, the two embodiments can achieve similar levels of performance.

The invention proposes a novel dual-wideband antenna structure. When the antenna structure is applied to a mobile device with a metal back cover, it effectively prevents the metal back cover from negatively affecting the communication quality of the mobile device because the metal back cover is considered as an extension portion of the antenna structure. It should be also noted that the invention can improve the appearance and design of the mobile device, without opening any antenna windows on the metal back cover. In conclusion, the invention has the advantages of small size, wide bandwidth, and beautiful device appearance, and therefore it is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
   a first ground element;
   a feeding element, having a feeding point;
   a shorting element, wherein the feeding element is coupled through the shorting element to the first ground element;
   a parasitic tuning element, coupled to the first ground element, wherein the parasitic tuning element is at least partially surrounded by the feeding element, the shorting element, and the first ground element;
   a second ground element, disposed adjacent to the feeding element;
   a first parasitic element, coupled to the second ground element;
   a second parasitic element, coupled to the second ground element; and
   a dielectric substrate, wherein the feeding element, the shorting element, the parasitic tuning element, the first parasitic element, the second parasitic element, and at least one of the first ground element and the second ground element are disposed on the dielectric substrate.

2. The antenna structure as claimed in claim 1, wherein the second ground element is coupled to a metal back cover of a mobile device.

3. The antenna structure as claimed in claim 2, wherein the first ground element or the second ground element is a portion of the metal back cover.

4. The antenna structure as claimed in claim 1, wherein the feeding element, the shorting element, and the parasitic tuning element are positioned between the first parasitic element and the second parasitic element.

5. The antenna structure as claimed in claim 1, wherein the feeding element, the shorting element, the parasitic tuning element, the first parasitic element, and the second parasitic element are positioned between the first ground element and the second ground element.

6. The antenna structure as claimed in claim 1, wherein the feeding element substantially has an inverted L-shape.

7. The antenna structure as claimed in claim 1, wherein the shorting element substantially has an inverted L-shape.

8. The antenna structure as claimed in claim 1, wherein the parasitic tuning element substantially has an inverted L-shape.

9. The antenna structure as claimed in claim 1, wherein a combination of the first parasitic element, the second ground element, and the second parasitic element substantially has an inverted U-shape.

10. The antenna structure as claimed in claim 1, wherein a coupling gap is formed between the feeding element and the second ground element, and a width of the coupling gap is from 0.1 mm to 2.5 mm.

11. The antenna structure as claimed in claim 1, wherein the antenna structure covers a low-frequency band from 2400 MHz to 2500 MHz, and a high-frequency band from 5150 MHz to 5850 MHz.

12. The antenna structure as claimed in claim 11, wherein a length of the feeding element is substantially equal to 0.25 wavelength of the high-frequency band.

13. The antenna structure as claimed in claim 11, wherein a length of the parasitic tuning element is shorter than 0.25 wavelength of the high-frequency band.

14. The antenna structure as claimed in claim 1, further comprising:
   a first capacitor, wherein the first parasitic element is coupled through the first capacitor to the first ground element.

15. The antenna structure as claimed in claim 1, further comprising:
   a second capacitor, wherein the second parasitic element is coupled through the second capacitor to the first ground element.

16. The antenna structure as claimed in claim 1, further comprising:
   a first switch element; and
   a plurality of first impedance elements, having different impedance values, wherein the first switch element selects one of the first impedance elements, such that the first parasitic element is coupled through the selected first impedance element to the first ground element.

17. The antenna structure as claimed in claim 1, further comprising:
   a second switch element; and
   a plurality of second impedance elements, having different impedance values, wherein the second switch element selects one of the second impedance elements, such that the second parasitic element is coupled through the selected second impedance element to the first ground element.

18. The antenna structure as claimed in claim 1, wherein the feeding element has a first end and a second end, and the feeding point is positioned at the first end of the feeding element.

19. The antenna structure as claimed in claim 18, wherein the second end of the feeding element is an open end, the shorting element is coupled to a median portion of the feeding element, and the median portion is positioned between the first end and the second end of the feeding element.

20. The antenna structure as claimed in claim 18, wherein the shorting element is coupled to the second end of the feeding element, such that a loop shape is formed by a combination of the feeding element, the shorting element, and the first ground element.

* * * * *